United States Patent
Shimada et al.

[11] Patent Number: 6,097,459
[45] Date of Patent: Aug. 1, 2000

[54] METHOD FOR PRODUCING A REFLECTION TYPE LIQUID CRYSTAL DISPLAY

[75] Inventors: Yasunori Shimada, Kashihara; Seiichi Mitsui, Kashiwa, both of Japan

[73] Assignee: Sharp Kabushiki Kaisha, Osaka, Japan

[21] Appl. No.: 09/104,121

[22] Filed: Jun. 24, 1998

Related U.S. Application Data

[62] Division of application No. 08/535,952, Sep. 29, 1995, Pat. No. 5,805,252.

[30] Foreign Application Priority Data

Oct. 3, 1994 [JP] Japan ................................ 6-239216

[51] Int. Cl.[7] .................................................. G02F 1/1335
[52] U.S. Cl. .......................................... 349/113; 349/130
[58] Field of Search ................................ 349/113, 187, 349/130

[56] References Cited

U.S. PATENT DOCUMENTS

| | | | |
|---|---|---|---|
| 4,431,272 | 2/1984 | Yazawa et al. | 350/336 |
| 4,456,336 | 6/1984 | Chung et al. | 349/113 |
| 4,519,678 | 5/1985 | Komatsubara et al. | 350/339 |
| 5,408,345 | 4/1995 | Mitsui et al. | 359/59 |
| 5,500,750 | 3/1996 | Kanbe et al. | 359/58 |
| 5,526,149 | 6/1996 | Kanbe et al. | 359/70 |
| 5,610,741 | 3/1997 | Kimura | 349/113 |

FOREIGN PATENT DOCUMENTS

| | | |
|---|---|---|
| 56-156864 | 12/1981 | Japan. |
| 2 066 545 | 7/1981 | United Kingdom. |

OTHER PUBLICATIONS

White, et al., "New absorptive mode reflective liquid–crystal display device", J. Appl. Phys. vol. 45, No. 11, pp. 4718–23 (Nov. 1974).

Kolzumi, et al., "Reflective Multicolor LCD (II): Improvement in the Brightness", Proceedings of the SID, vol. 29/2, pp. 157–160 (1988).

*Primary Examiner*—James A. Dudek
*Attorney, Agent, or Firm*—David G. Conlin; George W. Neuner; Dike, Bronstein, Roberts, and Cushman LLP

[57] ABSTRACT

A reflection type liquid crystal display comprises a first substrate including a rough portion formed on a surface thereof and a reflection electrode formed on the rough portion; a second substrate including a counter electrode formed thereon; and a liquid crystal layer interposed between the first and second substrates, driven by the reflection electrode and the counter electrode to perform a display. The reflection electrode is made of aluminum or aluminum alloy, and the reflection electrode includes surface oxidation layer having at least 5 nm thickness. The first substrate includes a vertical alignment film made of insulating material formed on the surface oxidation layer of the reflection electrode.

7 Claims, 13 Drawing Sheets

PRIOR ART

PRIOR ART

PRIOR ART

PRIOR ART

PRIOR ART

METHOD FOR PRODUCING A REFLECTION TYPE LIQUID CRYSTAL DISPLAY

RELATED U.S. APPLICATION DATA

This application is a divisional application of a U.S. patent application Ser. No. 08/535,952 filed on Sep. 29, 1995, now U.S. Pat. No. 5,805,252.

BACKGROUND OF THE INVENTION

1. Field of the Invention

The present invention relates to a reflection type liquid crystal display device for providing a display by reflecting incident light and a method for producing the device.

2. Description of the Related Art

In recent years, applications of liquid crystal displays in word processors, laptop personal computers, pocket televisions and the like have advanced. Among liquid crystal display devices, a reflection type liquid crystal display, which provides a display by reflecting incident light, and thus requires no back light source, has received considerable attention because it can realize low power consumption and can be made thin and miniaturized.

Conventionally, reflection type liquid crystal display devices have employed a twisted nematic (TN) mode or super-twisted nematic (STN) mode as a display mode. However, these display modes require a polarizer. Consequently, half of the incident light is not utilized for the display, resulting in a darker display.

To obtain a brighter display, display modes without polarizers have been proposed in which all of natural incident light is effectively utilized. As an example, a phase transition type guest-host mode is utilized whereby a cholesteric-nematic phase transition phenomena is caused by an electric field (see, e.g., D. L. White and G. N. Taylor, J. Appl. Phys. 45, pp. 4718–4723, 1974). Also, a multi-color reflection type display in which a micro color filter is used in combination with the guest-host mode has been proposed (see, e.g., Tohru Koizumi and Tatsuo Uchida, Proceedings of the SID, Vol. 29. pp. 157–160, 1988).

To realize an even brighter display in a display mode which does not require a polarizer, it is necessary to increase the intensity of scattered light in a direction perpendicular to a display screen for the incident light at every incident angle. This requires a reflector which has optimum reflective characteristics. The above-mentioned article of White et. al. describes a reflector which is manufactured by roughening a surface of a substrate such as glass by using abrasive; controlling the surface asperities by varying the time of etching with hydrochloric acid; and forming a silver foil on the asperities of the surface.

In a case where a conventional active matrix substrate 20, as shown in FIG. 1, is used for a reflection type liquid crystal display, the active matrix substrate 20 on which driving devices are formed is required to function as a reflector. The structure of the conventional active matrix substrate 20 will be described below.

FIG. 1 shows in relevant portion the active matrix substrate 20 which includes a thin film transistor (TFT) 1 as a switching element. FIG. 2 is a cross-sectional view taken along the line V—V in FIG. 1. As shown in FIGS. 1 and 2, the active matrix substrate 20 includes an insulator substrate 2 such as glass, for example, and a plurality of gate bus lines 3 made of chromium, tantalum or the like, which are disposed in parallel on the insulator substrate 2. Gate electrodes 4 branch off from each of the gate bus lines 3. The gate bus lines 3 function as scanning lines as is conventional.

A gate insulating film 5 is formed on the entire surface of the insulator substrate 2 covering the gate bus lines 3 and the gate electrodes 4. The gate insulating film 5 is made of silicon nitride (SiNx), silicon oxide (SiOx), or the like. A semiconductor layer 6 made of amorphous silicon (a-Si), polycrystalline silicon (p-Si), cadmium selenide (CdSe), or the like is formed on the gate insulating film 5 in each area thereof above the gate electrode 4. A source electrode 7 made of titanium, molybdenum, aluminum, or the like is disposed so as to overlap one end of the semiconductor layer 6 in each area. Similarly, a drain electrode 8 made of titanium, molybdenum, aluminum, or the like is disposed to overlap the other end of the semiconductor layer 6 in each area. A pixel electrode 9 is formed to overlap an opposite end of the drain electrode 8 against the end on which the semiconductor layer 6 is overlapped. The pixel electrodes 9 are a transparent conductive film made of a material such as indium tin oxide (ITO).

As shown in FIG. 1, a plurality of source bus lines 10 are disposed to cross the gate bus lines 3 with the gate insulating film 5 interposed therebetween. The source electrodes 7 are connected to respective source bus lines 10. The source bus lines 10 are made of the same material as that of the source electrodes 7 and function as signal lines. The TFT 1 is formed by the gate electrode 4, the gate insulating film 5, the semiconductor layer 6, the source electrode 7 and the drain electrode 8. The TFT 1 functions as a switching element as will be appreciated.

In order to use the active matrix substrate 20 for a reflection type liquid crystal display, not only the pixel electrodes 9 are required to be made of metal exhibiting a reflection property such as aluminum or silver, but also the gate insulating film 5 is required to have a scattering property, for example, to have asperities on its surface. Nevertheless, it is difficult to form asperities uniformly on the surface of the gate insulating film 5 which is made of an inorganic material.

Regarding a method for increasing the intensity of light scattered in the direction perpendicular to the display screen, it has been proposed in UK Patent Application No. 2 066 545 A to use a metallic thin film having surface asperities as a reflector. FIGS. 3A to 3D and 4A to 4F show variations of forms of the surface asperities (roughened surface) of the metallic thin film described in the article. The degree of whiteness of the appearance of the roughened surface varies as the height (H) and period (L) of the asperities vary (as discussed in more detail with reference to FIGS. 5A to 5C).

Accordingly, these factors H and L should be controlled well in order to realize an optimum reflection property.

As shown in FIG. 5A, in the case where L>>H, reflection components of the light from the metallic thin film are greater than scattering components. Thus the metallic thin film has a specular surface. In the case where L=H, as shown in FIG. 5B, the scattering components are dominant and the metallic thin film exhibits a white surface. In the case where L<<H, as shown in FIG. 5C, the incident light is absorbed by troughs formed by the asperities of the metallic thin film. Thus the metallic thin film exhibits a gray to black surface. In FIGS. 5A to 5C, the height H is approximately 0.01 μm to 2.0 μm.

In the case where the metallic thin film 51 has a height H greater than a period L, a reflector 50 may have a laminated structure as shown in FIG. 6. The reflector 50 includes a thin insulating layer 53 and another metallic thin film 52 formed on the metallic thin film 51, resulting in white reflected light from the reflector 50 including laminated thin film layers. The insulating layer 53 is made of a material such as $SiO_2$ or $Si_3N_4$ and is formed on the metallic thin film 51 by using a chemical vapor deposition (CVD) technique or sputtering technique. The metallic thin film 52 having a roughened surface is formed on the insulating layer 53.

A metallic thin film may be formed by using one of the following techniques:

(1) Vacuum evaporation or sputtering technique.

(2) Vacuum evaporation or sputtering technique with subsequent heat treatment and recrystallization.

(3) Vacuum evaporation or stuttering technique for forming an alloy thin film, then heat treatment for precipitation (separation), and etching for removing precipitated particles from the surface of the alloy thin film.

The first technique makes the asperities of the metallic thin film surface by controlling conditions of the vacuum evaporation or sputtering when the metallic thin film is formed on a substrate. The temperature of the substrate is kept high (more than 100° C.) and a very small amount of water is to be contained in the atmosphere in which the metallic thin film is deposited.

The second technique makes the asperities of the metallic thin film surface by heating and recrystallizing the metallic thin film which is formed on the substrate by vacuum evaporation or sputtering. In the event aluminum or aluminum alloy is used for the metallic thin film, recrystallization occurs at a temperature ranging from 100° C. to 600° C., as the melting point is 660° C. The recrystallization causes atoms included in the metallic thin film to be rearranged, resulting in a roughened surface thereof.

In the third technique, as shown in FIG. 7, an alloy thin film 63 is formed on a substrate 61 using vacuum evaporation or a sputtering technique. Then, the alloy thin film 63 is heated to precipitate particles 64 from the alloy thin film 63. The surface of the alloy thin film 63 is removed by etching, resulting in asperities of the surface.

In the case where the metallic thin film 63 is an aluminum alloy which contains 2% by weight of silicon and is heated for 20 minutes in a $N_2$ atmosphere at 400° C., precipitated particles 64 of an intermetallic compound of aluminum and silicon have diameters ranging from 0.2 $\mu$m to 1.0 $\mu$m. For example, by heating and precipitating the metallic thin film 63 having a thickness of 1.0 $\mu$m and by etching off the surface thereof by 0.2 $\mu$m, the metallic thin film 63 exhibits white color (i.e., the light reflected by the surface of the metallic thin film 63 appears white).

In addition, the U.K. article suggests that the surface of a metallic thin film can be roughened by sand blasting or shot blasting.

As shown in FIG. 2, the active matrix substrate 20 has concave and convex portions and comparatively large steps on the surface due to driving devices such as switching elements, capacitors, and the like. These concave and convex portions and large steps undesirably affect an alignment film (not shown) which is formed on the surface of the substrate 20. In order to avoid this problem and to improve the effect of the alignment film, the article suggests that a transparent film may be provided on the substrate 20 covering driving devices formed on the substrate 20, so as to make the surface of the substrate 20 level. The transparent film may be made of organic resin such as silicon resin, epoxy resin and polyamide resin, or inorganic resin.

The U.K. article also suggests that a white insulating layer 80 (shown in FIG. 8) may be formed in place of, or in addition to, the metallic thin film in order to make the substrate have a white appearance. The white insulating layer 80 is made of transparent organic resin 82 including fine metal oxide particles 81.

In order to obtain a white appearance, the U.K. article suggests another method in which the surface of the metallic thin film made of aluminum or aluminum alloy is anodized to form an alumina ($Al_2O_3$) layer. For example, as shown in FIG. 9, by anodizing an aluminum or aluminum alloy layer 92 formed on a substrate 91, an alumina layer 93 having a thickness of 5 $\mu$m to 30 $\mu$m is formed. The alumina layer 93 has a honeycomb structure. Incident light 94 is scattered by interfaces 96 of the honeycomb structure as well as the surface of the alumina layer 93 as shown in FIG. 9, resulting in a white appearance. The alumina layer 93 insulates an electric current, so that it improves reliability of a liquid crystal display in which driving electrodes are directly in contact with the liquid crystal.

However, it is difficult to form uniform asperities of the surface of the metallic thin film by using the above mentioned techniques described in the aforementioned articles, because precipitation and etching processes have an unpredictable nature.

The white appearance of reflected light from a reflector (such as a face of substrate or a metallic thin film) means that the incident light is reflected and scattered in all directions and at all angles. In a case where the reflector includes electrodes for driving the liquid crystal and is formed on an active matrix substrate in contact with the liquid crystal, the reflected light goes through the liquid crystal and a counter substrate into the air. When the air has a refractive index of 1 and the substrates and the liquid crystal layer have a refractive index of 1.5, reflected (scattered) light from the reflector which enters an interface of the substrate and the air with an incident angle greater than about 48° is reflected by the interface so that the light does not travel out from the display. Accordingly, a "white" reflector which reflects and scatters the incident light in all directions and at all angles makes the display darker by not utilizing some components of reflected light.

A reflector for realizing a brighter display needs to have directional properties for controlling the reflected light. Nevertheless, it is difficult to form a reflector having the directional properties by using the above mentioned techniques because of the unpredictable nature of the processes.

Reflective characteristics of a reflector formed by heating an aluminum or aluminum alloy layer in an inert gas at a temperature of 400° C. to 450° C. are relatively specular so that a liquid crystal panel utilizing the reflector appears dark (see, for example, Japanese Laid Open Patent No. 56-156864). In order to obtain more scattering properties of the reflector (i.e., highly rugged surface), the aluminum or aluminum alloy layer needs to be heated at a higher temperature.

However, switching elements used for driving a liquid crystal layer cannot stand such a high temperature. For example, a-Si TFTs formed on a glass substrate are destroyed at a temperature higher than 350° C. where hydrogen contained in the semiconductor layer of the TFT leaves therefrom. In a case of MIM (metal-insulator-metal) elements which are formed by anodizing metal such as tantalum, the MIM elements are also destroyed at such a high temperature where incomplete oxidized tantalum ions in an interface between a tantalum layer and an anodized tantalum layer diffuse into the anodized layer.

Accordingly, with respect to a reflector used for a liquid crystal display comprising such switching elements as mentioned above, heating processes are required to be performed at a temperature lower than 300° C.

In addition, a reflector formed by using the above mentioned precipitation technique appears dark when a liquid crystal layer is mounted thereon (see Japanese Laid Open Patent No. 56-156864).

The above mentioned Japanese Laid Open Patent also describes a method for forming a reflector which has directional properties for controlling the reflected light, in the case where the reflector is used in an active matrix substrate including switching elements such as a-Si TFT or MIM elements. According to this method, a $SiO_2$ layer is formed on a substrate as shown in FIG. 10 so as to have a sinusoidal wave shape in its cross section by using CVD technique, and an aluminum layer is formed to coat the surface of the $SiO_2$ layer. The reflector has an average angle θ of 5° to 30°.

U.S. Pat. No. 4,431,272 also describes a reflector (aluminum electrode) in which an aluminum layer is formed on a rugged $SiO_2$ layer. The reflector has asperities on the surface thereof as shown in FIG. 11.

U.S. Pat. No. 5,408,345 describes a reflector formed by a metallic thin film represented by a plurality of reflection electrodes formed on an organic insulating film which is formed on a substrate covering switching elements and bus lines. The organic insulating film has asperities in a surface region thereof. The organic insulating film is formed by coating photo sensitive resin on a substrate; exposing the photo sensitive resin layer to light by using a photo mask which has circular light shielding portions; and developing the photo sensitive resin layer followed by a heating process, so as to form a plurality of bumps.

As described above, reflectors having asperities are obtained by forming a lower layer having a rugged surface (bumps, or small concave and convex portions), followed by forming a metallic (specular) thin film on the rugged lower layer, rather than by heating the metallic thin film to obtain scattering properties.

A conventional method for fabricating a phase transition type guest-host liquid crystal display using a vertical alignment film is as follows:

Reflective pixel electrodes of aluminum are formed on a substrate on which driving devices such as switching elements, bus lines and the like has been already formed. A vertical alignment film is formed by printing or coating an alignment film material on the substrate covering at least the reflective pixel electrodes, followed by a heating process at a predetermined temperature so as to make an active matrix substrate. Then an adhesive sealing material including, for example, spacers of 7 μm diameter is applied on the active matrix substrate by using screen printing. The active matrix substrate is then combined and adhered with a counter substrate which has counter electrodes of ITO and a vertical alignment film formed thereon. Liquid crystal is filled in a space formed between the active matrix substrate and the counter substrate.

However, in a liquid crystal display fabricated according to the above mentioned method, the liquid crystal between the substrates has a focal conic texture as shown in FIG. 12. The liquid crystal having such as a focal conic texture requires a relatively higher driving voltage and the response speed thereof is low.

SUMMARY OF THE INVENTION

The reflection type liquid crystal display of the present invention comprises: a first substrate including a rough portion formed on a surface thereof and a reflection electrode formed on the rough portion; a second substrate including a counter electrode formed thereon; and a liquid crystal layer interposed between the first and second substrates, driven by the reflection electrode and the counter electrode to perform a display. The reflection electrode is made of aluminum or aluminum alloy, and the reflection electrode includes surface oxidation layer having at least 5 nm thickness. The first substrate includes a vertical alignment film made of insulating material formed on the surface oxidation layer of the reflection electrode.

In one embodiment of the present invention, the surface oxidation layer of the reflection electrode has a thickness of 5 nm to 10 nm.

The surface of the reflection electrode preferably remains specular and is formed along asperities of the rough portion of the first substrate.

The reflection type liquid crystal display of the present invention comprises: a first substrate including a rough portion formed on a surface thereof and a reflection electrode formed on the rough portion; a second substrate including a counter electrode formed thereon; and a liquid crystal layer interposed between the first and second substrates, driven by the reflection electrode and the counter electrode to perform a display. The reflection electrode is made of aluminum or aluminum alloy, and the first substrate includes an oxidized film formed on the reflection electrode; and a vertical alignment film made of insulating material formed on the oxidized film.

In one embodiment of the present invention, the oxidized film has a thickness of 50 nm to 100 nm.

The oxidized film is preferably made of silicon oxide.

The method of the present invention is a method for producing a reflection type liquid crystal display comprising: a first substrate including a rough portion formed on a surface thereof, a reflection electrode formed on the rough portion, an oxidized layer formed on the reflection electrode, and a vertical alignment film made of insulating material formed on the oxidized layer; a second substrate including a counter electrode formed thereon; and a liquid crystal layer interposed between the first and second substrates, driven by the reflection electrode and the counter electrode to perform a display. The method includes the steps of: pattering the reflection electrode from a thin metallic film made of aluminum or aluminum alloy which is formed on the first substrate covering the rough portion; oxidizing a surface of the reflection electrode whereby forming an oxidized layer having a thickness of at least 5 nm; applying vertical alignment film material at least on the oxidized layer; and heating and curing the vertical alignment film material whereby forming the vertical alignment film.

The oxidized layer is preferably formed to have a thickness of 5 nm to 10 nm in the oxidizing step.

In one embodiment of the present invention, the oxidizing step is performed in an atmosphere including oxygen and at a temperature 170° C. to 200° C. which is higher than a heating temperature of the heating and curing step.

In another embodiment of the present invention, the oxidizing step is performed by soaking the reflection electrode in hydrogen peroxide solution or nitric acid solution.

The method of the present invention is a method for producing a reflection type liquid crystal display comprising: a first substrate including a rough portion formed on a surface thereof, a reflection electrode formed on the rough portion, an oxidized layer formed on the reflection electrode, and a vertical alignment film made of insulating material formed on the oxidized layer; a second substrate including a counter electrode formed thereon; and a liquid crystal layer interposed between the first and second substrates, driven by the reflection electrode and the counter electrode to perform a display. The method includes the steps of: patterning the reflection electrode from a thin metallic film made of aluminum or aluminum alloy which is formed on the first substrate covering the rough portion; forming an oxidized film on the first substrate so as to cover the reflection electrode; applying vertical alignment film material on the oxidized film; and heating and curing the vertical alignment film material whereby forming the vertical alignment film.

In one embodiment of the present invention, the oxidized film is formed to have a thickness of 50 nm to 100 nm in the forming step.

In another embodiment of the present invention, the oxidized film is made of silicon oxide.

Thus, the invention described herein makes possible the advantages of (1) providing a liquid crystal display which is driven by a relatively low voltage level and has high response speed, and (2) a method for fabricating the liquid crystal display.

These and other advantages of the present invention will become apparent to those skilled in the art upon reading and understanding the following detailed description with reference to the accompanying figures.

DESCRIPTION OF THE PREFERRED EMBODIMENTS

In the case where reflection electrodes for driving a liquid crystal layer are made of aluminum or aluminum alloy and counter electrodes are made of ITO, the liquid crystal disposed therebetween is in a focal conic state, although the liquid crystal is not directly in contact with either of electrodes, with vertical alignment films intervening between the electrodes and the liquid crystal.

Figure 1:
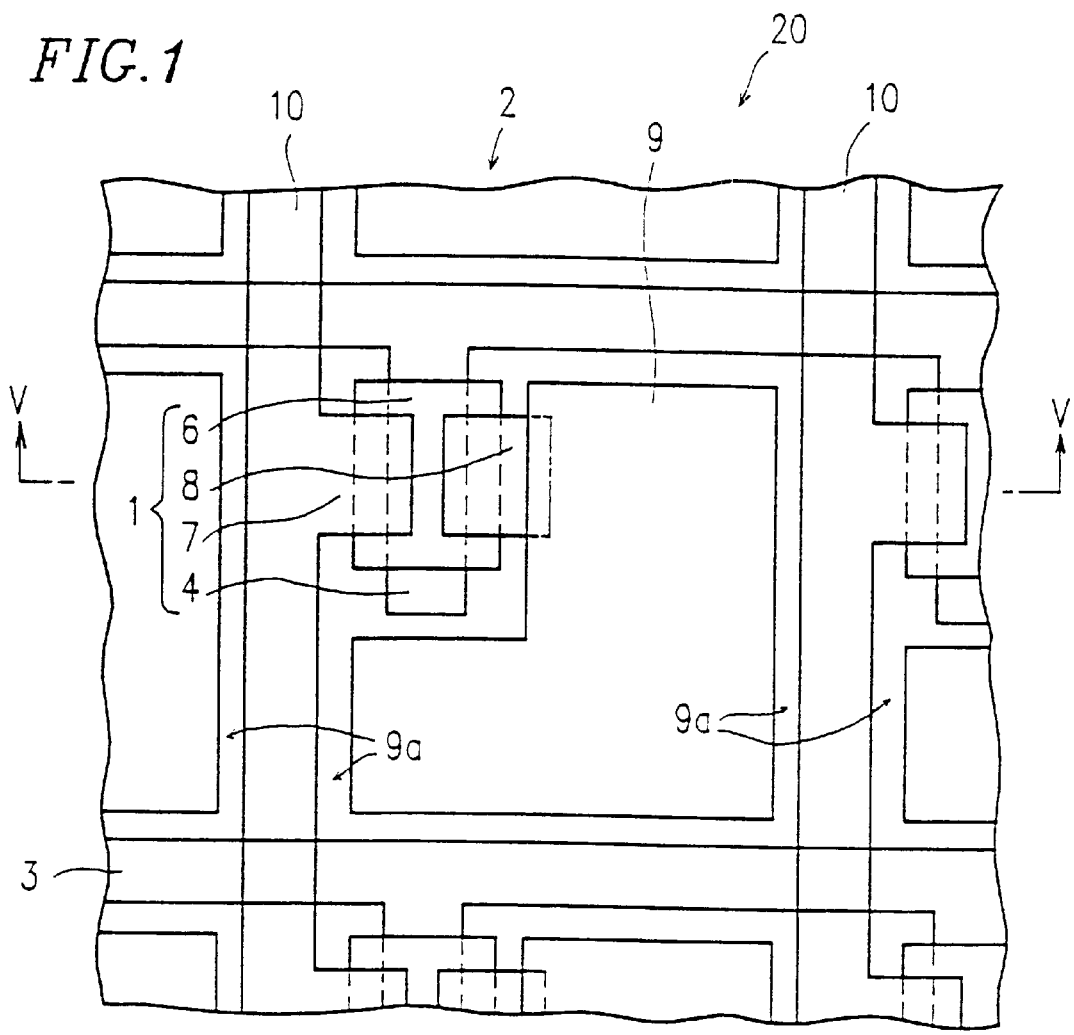
FIG. 1 is a partial plan view of an active matrix substrate of a conventional reflection type liquid crystal display.
Figure 2:
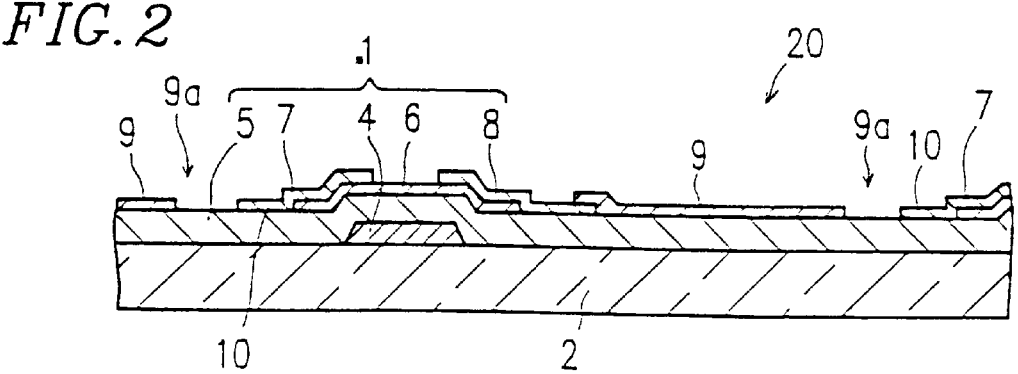
FIG. 2 is a cross-sectional view of the active matrix substrate taken along a line V—V in FIG. 1.
Figure 3A:
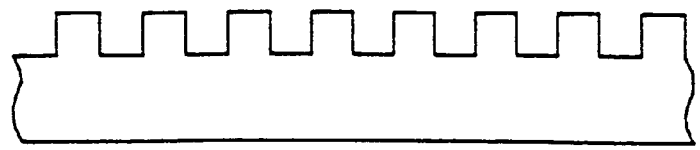
FIGS. 3A to 3D are cross-sectional views of respective reflectors (metallic thin films) used in conventional reflection type liquid crystal displays.
Figure 3B:
Figure 3C:
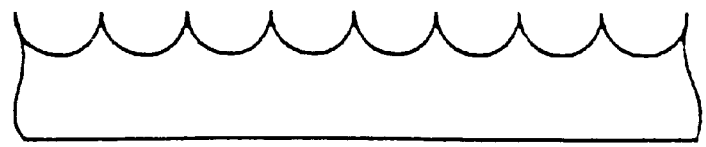
Figure 3D:
Figure 4A:
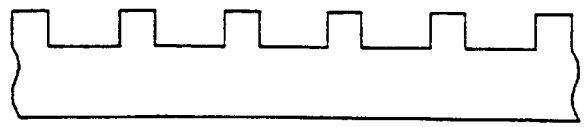
FIGS. 4A to 4F are cross-sectional views of respective reflectors used in conventional reflection type liquid crystal displays.
Figure 4B:
Figure 4C:
Figure 4D:
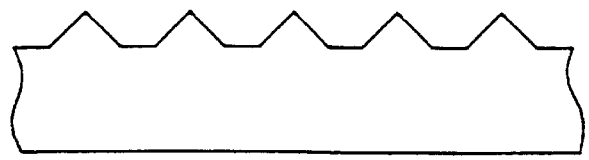
Figure 4E:
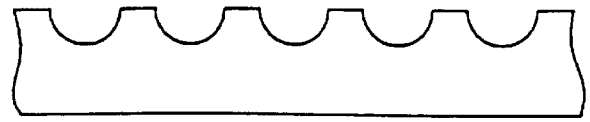
Figure 4F:
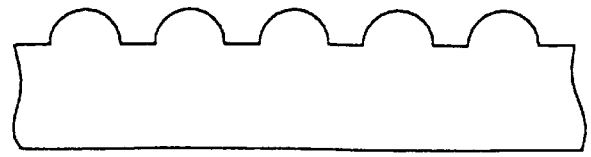
Figure 5A:
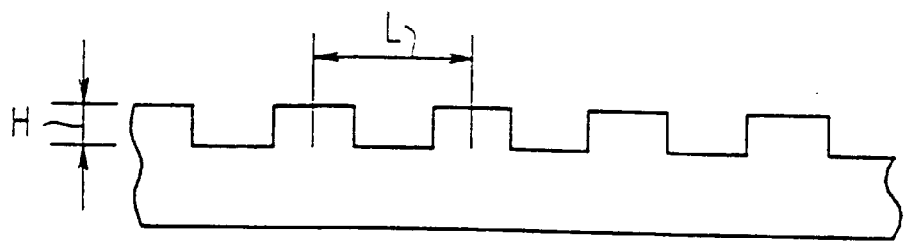
FIGS. 5A to 5C are cross-sectional views of a reflector illustrating the relationship of height and period of asperities of the reflector.
Figure 5B:
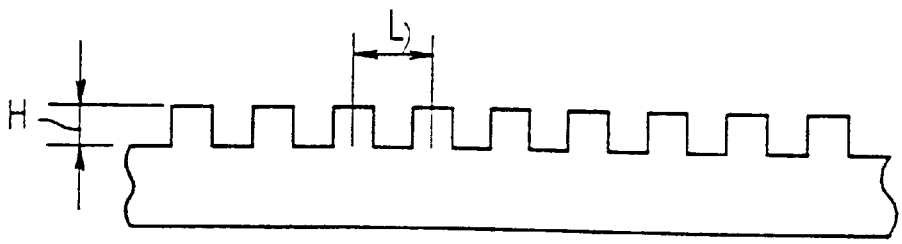
Figure 5C:
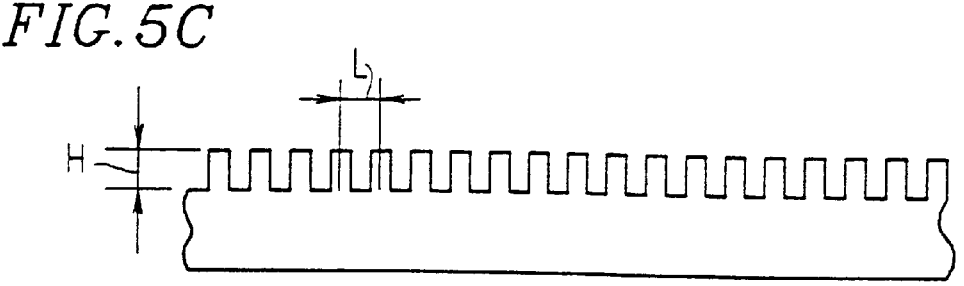
Figure 6:
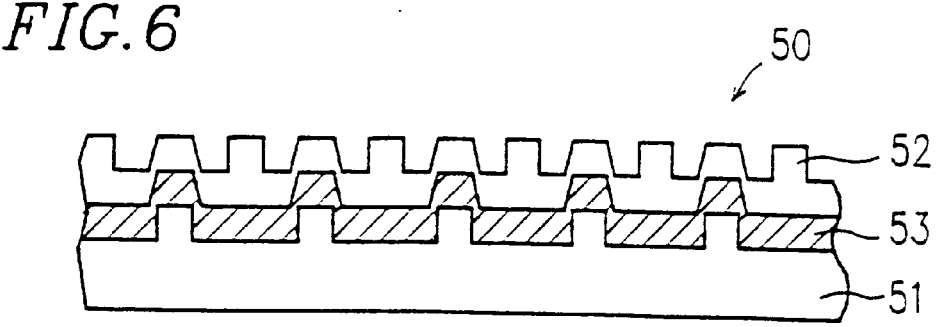
FIG. 6 is a cross-sectional view of laminated thin layers included in a reflector used in a conventional liquid crystal display.
Figure 7:
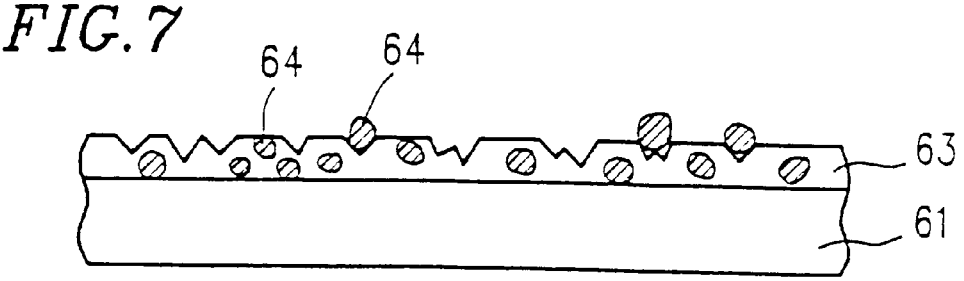
FIG. 7 is a cross-sectional view of a reflector used in a conventional liquid crystal display, which is formed by using precipitation and etching technique.
Figure 8:
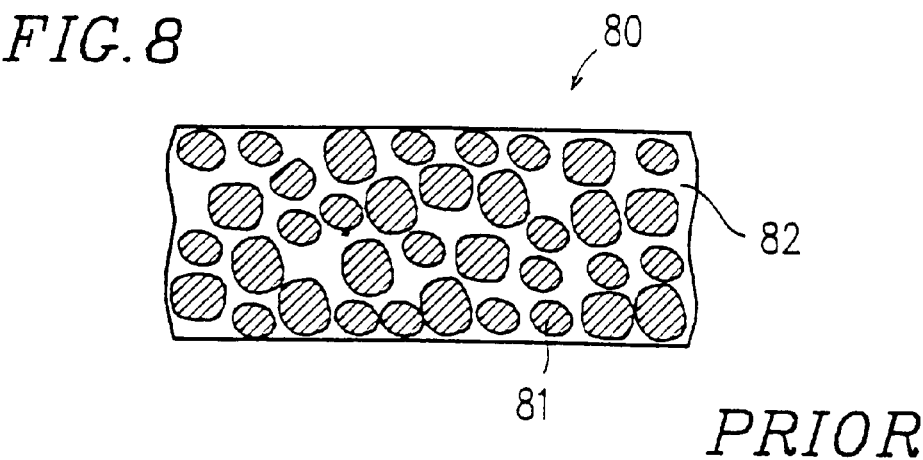
FIG. 8 is a cross-sectional view of a reflector used in a conventional liquid crystal display, which is formed by using resin including fine metal oxide particles.
Figure 9:
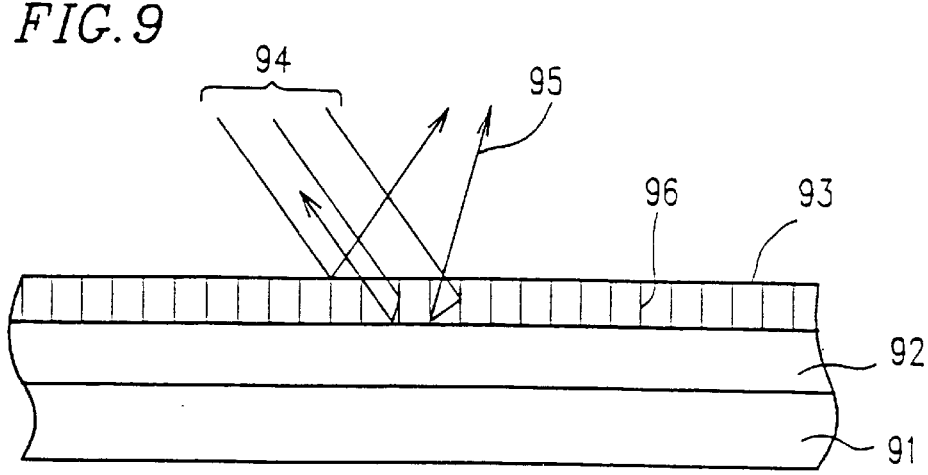
FIG. 9 is a cross-sectional view of a reflector including an alumina layer having a honeycomb structure used in a conventional liquid crystal display, which is formed by anodizing an aluminum electrode.
Figure 10:
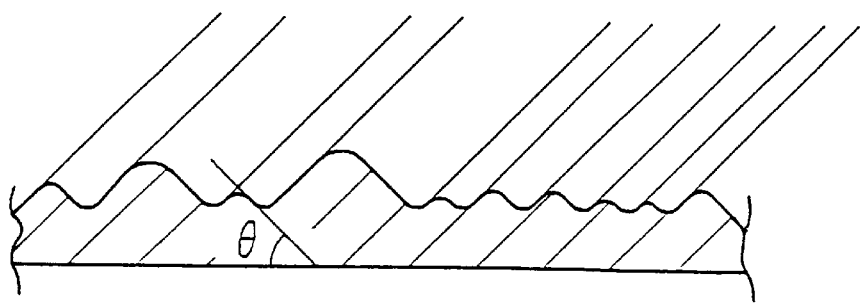
FIG. 10 is a cross-sectional view of a reflector having a sinusoidal wave shape used in a conventional liquid crystal display.
Figure 11:
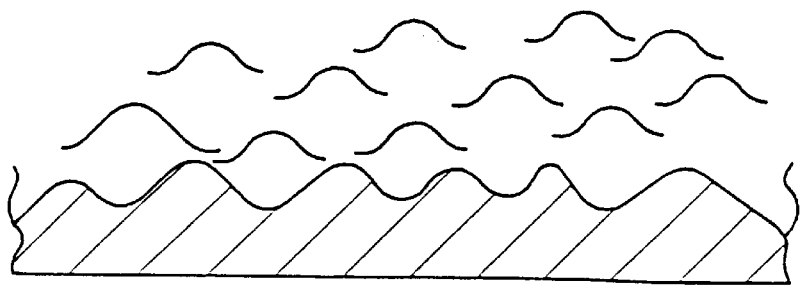
FIG. 11 is a cross-sectional view of a reflector having asperities used in a conventional liquid crystal display.
Figure 12:
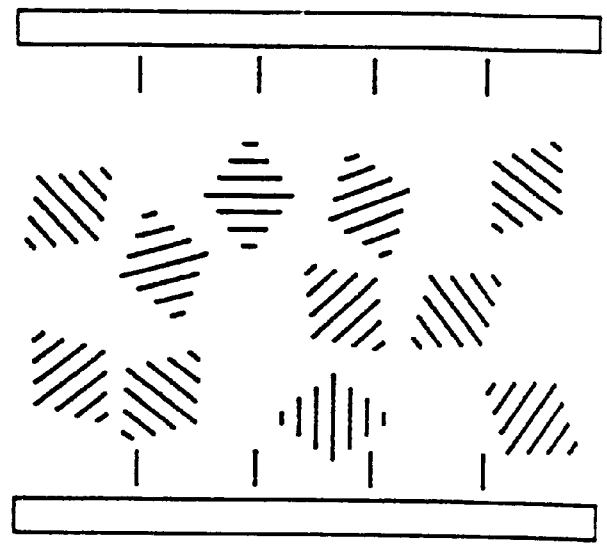
FIG. 12 is a schematic diagram illustrating a focal conic texture of a liquid crystal layer.
Figure 13:
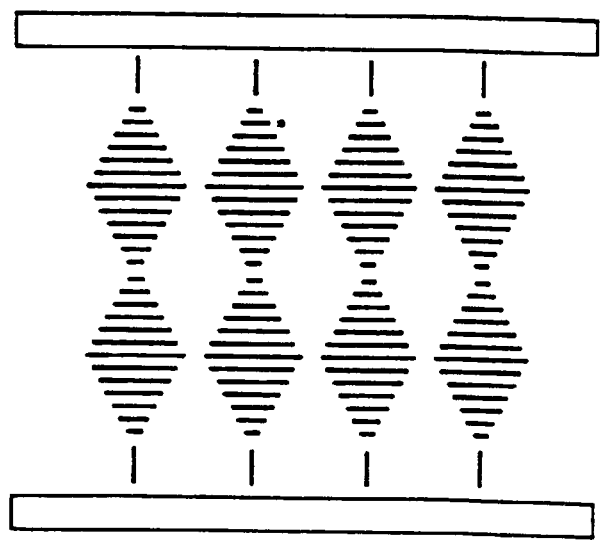
FIG. 13 is a schematic diagram illustrating a Grandjean texture of a liquid crystal layer.

The inventors have found through experimentation that when both the driving electrodes and counter electrodes are made of ITO, the liquid crystal has a Grandjean texture as shown in FIG. 13 with vertical alignment films formed on the substrates covering the electrodes.

The inventors have determined, after further experimentation, how to make the liquid crystal layer have the Grandjean texture when the reflection electrodes are made of metal such as aluminum or aluminum alloy and the counter electrodes are made of ITO. That is, the Grandjean texture of the liquid crystal is obtained by oxidizing the surface of the reflection electrode to form an oxidized layer on the reflection electrode or by coating the reflection electrode with an oxidized film such as silicon oxide.

Generally speaking, the oxidized layer of the surface of each reflection electrode preferably has a thickness of 5 nm to 10 nm. When the oxidized surface layer is thinner than 5 nm, the liquid crystal layer is in a mixture state of the focal conic texture and the Grandjean texture. On the other hand, when the oxidized layer is thicker than 10 nm, this makes the reflection electrode (reflector) appear dark.

Alternatively, an oxidized film coating on the reflection electrode preferably has a thickness of 50 nm to 100 nm. When the oxidized film coating is thinner than 50 nm, the oxidized film coating is formed on the reflection electrode in an island-pattern so that the liquid crystal is in a mixture state of the focal conic texture and the Grandjean texture. On the other hand, the oxidized film coating which is thicker than 100 nm makes the reflection electrode (reflector) appear dark.

The preferred conditions for forming the oxidized layer on the reflection electrode are at a temperature of 170° C. to 200° C., which is higher than a temperature for curing photo sensitive resin to form the insulating film, and in an atmosphere including oxygen. When the temperature is lower than 170° C., the oxidized layer can not be formed in a required thickness thereof. On the other hand, a temperature higher than 200° C. forms hillocks on the surface of the reflective electrode of aluminum, resulting in an increase of uncontrollable scattering components of the reflected light. In addition, the temperature should be higher than that of the curing temperature of the photo sensitive resin, otherwise the Grandjean texture can not be obtained.

Hereinafter, the present invention will be described by way of illustrative examples with reference to the accompanying drawings.

EXAMPLE 1

Figure 14:
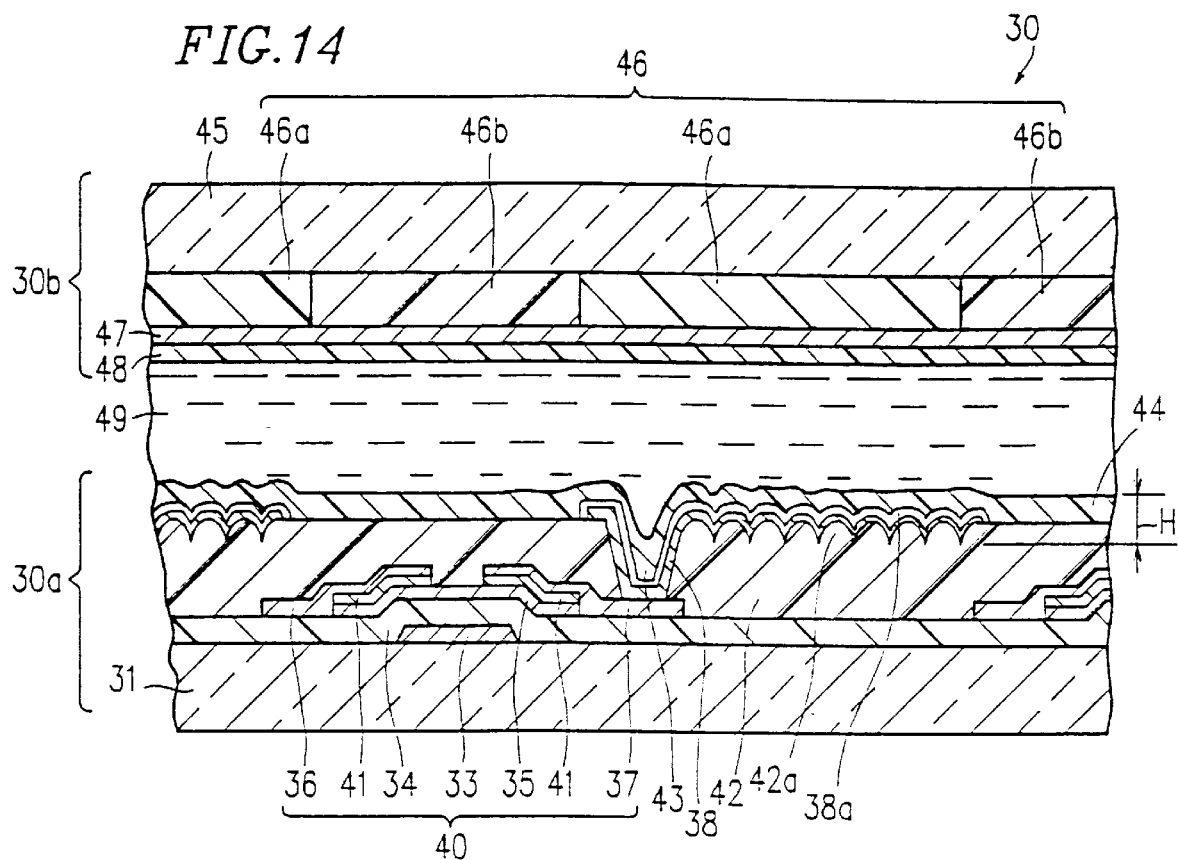
FIG. 14 is a partial cross-sectional view of a reflection type liquid crystal display of one embodiment of the present invention.
Figure 15:
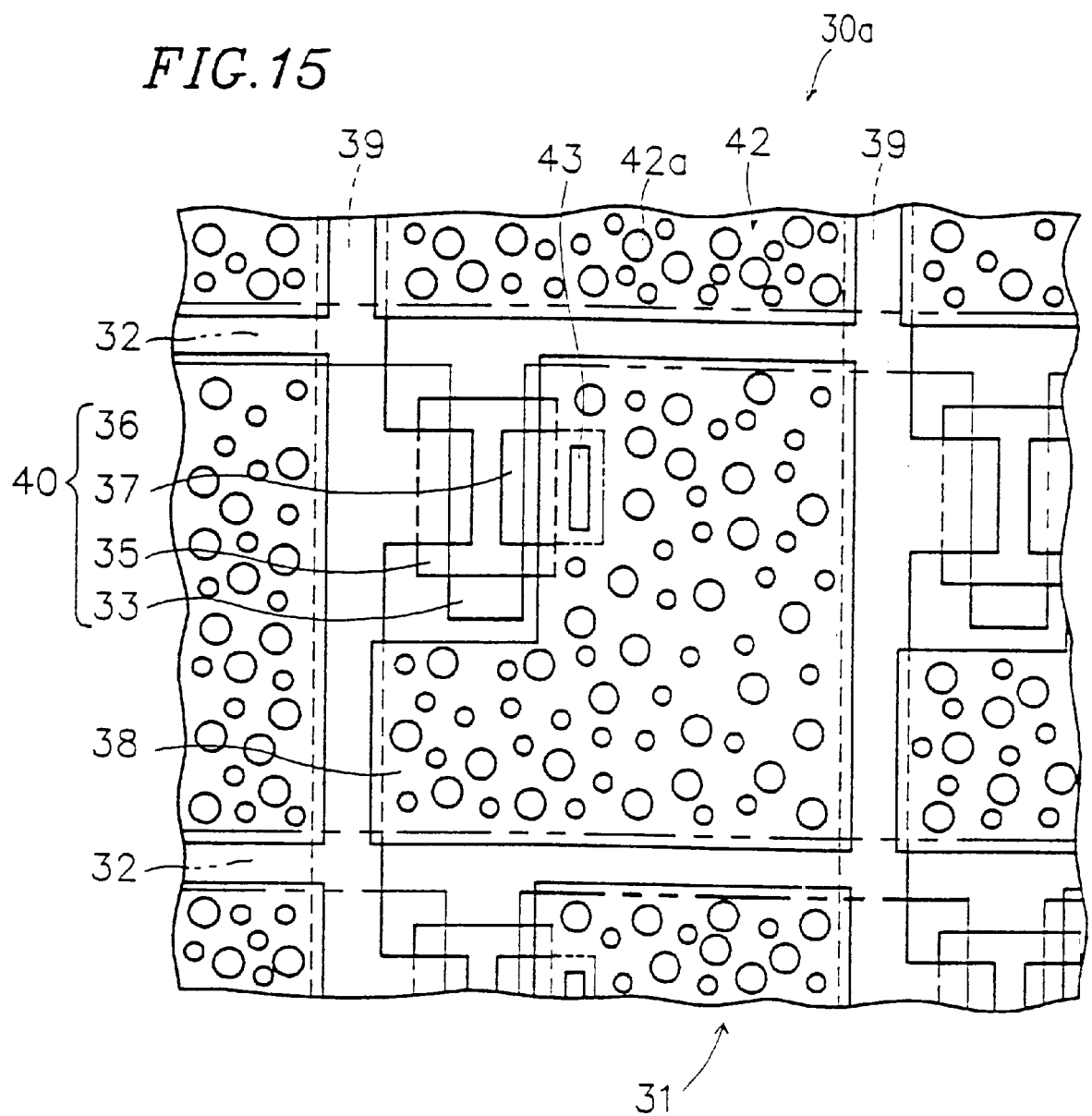
FIG. 15 is a partial plan view of a lower (active matrix) substrate of the present invention.

FIG. 14 is a cross-sectional view of a reflection type liquid crystal display 30 of one embodiment of the present invention. The liquid crystal display 30 includes a lower substrate (active matrix substrate) 30a, an upper substrate (counter substrate) 30b, and a liquid crystal layer 49 interposed therebetween. FIG. 15 is a plan view of the lower substrate 30a.

The structure of the lower substrate 30a will be described. In the lower substrate, a plurality of gate bus lines 32 are disposed parallel to each other on an insulator substrate 31 such as a glass substrate. The gate bus lines 32 are made of chromium, tantalum or the like. Gate electrodes 33 are provided to be branched off from each of the gate bus lines 32. The gate bus lines 32 function as scanning lines.

A gate insulating film 34, which is made of silicon nitride (SiNx), silicon oxide (SiOx), or the like, is formed on the entire surface of the insulator substrate 31, covering the gate bus lines 32 and the gate electrodes 33. A semiconductor layer 35, which is made of amorphous silicon (a-Si), polycrystalline silicon (p-Si), cadmium selenide (CdSe), or the like, is formed on the gate insulating film 34 in each area above the gate electrodes 33. A source electrode 36, which is made of titanium, molybdenum, aluminum, or the like, is disposed to overlap one end of the semiconductor layer 35 in each area. Similarly, a drain electrode 37 which is made of titanium, molybdenum, aluminum, or the like, is disposed to overlap the other end of the semiconductor layer 35 in each area.

A plurality of source bus lines 39 are disposed to cross the gate bus lines 32 with the gate insulating film 34 interposed therebetween. The source electrodes 36 are connected to the respective source bus lines 39. The source bus lines 39 are made of the same material as that of the source electrodes 36. The source bus lines 39 function as signal lines as is conventional.

A TFT 40 is formed by the gate electrode 33, the gate insulating film 34, the semiconductor layer 35, the source electrode 36, and the drain electrode 37. The TFT 40 functions as a switching element as will be appreciated.

As shown in FIG. 14, an organic insulating film 42 is formed on the entire surface of the substrate 31 so as to cover the TFTs 40. The organic insulating film 42 has convex portions (bumps) 42a in regions on which reflection electrodes 38 are to be formed. Each bump 42a has a height of H and is tapered, and a tip potion thereof has a circular cross-section. The organic insulating film 42 also has a contact hole 43 in a portion thereof on each drain electrode 37.

A reflection electrode 38 made of aluminum is formed on the organic insulating film 42 to overlap an opposite end of the drain electrode 37 against the end on which the semiconductor layer 35 is overlapped. The reflection electrode 38 is connected to the drain electrode 37 via the contact hole 43.

An oxidized layer 38a of alumina (aluminum oxide) is formed on the surface of the reflection electrode 38. A vertical alignment film 44 is formed on the entire surface of the substrate 31 covering the oxidized layer 38a.

The counter substrate 30b includes a substrate 45; a color filter 46; a transparent counter electrode 47, which is made of a material such as ITO, covering the entire surface of the color filter 46; and a vertical alignment film 48 formed on the transparent electrode 47. The color filter 46 includes a filter portion 46a of magenta or green, which is provided in each position corresponding to the reflection electrode 38 on the substrate 30a; and a black matrix (black filter) 46b in a portion corresponding to other than the reflection electrode 38.

A method for producing the liquid crystal display 30 will now be described.

On the substrate 31, gate bus lines 32, gate electrodes 33, gate insulating film 34, semiconductor layer 35, source electrodes 36, drain electrodes 37, and source bus lines 39 are formed in a conventional manner, so as to form TFTs 40.

Then, an organic insulating film 42 is formed on the entire surface of the substrate 31 so as to cover the TFTs 40. Convex portions (bumps) 42a are formed in regions of the organic insulating film 42 on which reflection electrodes 38 is to be formed. Each bump 42a are formed to have a height of H and to be tapered, and a tip potion thereof is formed to have a circular cross-section. The bumps 42a of the organic insulating film 42 may be formed using photolithography in order to control shape, size, and pattern thereof. The shape, size and pattern of the bumps 42a are determined to realize optimum reflective properties (directionality) of the reflection electrode 38 which is to be formed thereon.

Although the present invention can employ any conventional method for forming the bumps 42a, a method and thus formed bumps suitable for use in conjunction with the present invention are that shown and described in the above-mentioned U.S. Pat. No. 5,408,345 of Mitsui et. al. entitled "Reflection Type Liquid Crystal Display Device wherein the Reflector Has Bumps", which is incorporated herein by reference.

A contact hole 43 is also formed in the organic insulating film 42 in a portion corresponding to each drain electrode 37, by using photolithography and a dry etching method. The height H of the bumps 42a is preferably not greater than 10 μm in view of difficulties which otherwise may be incurred during processes of forming the organic insulating film 42 and the contact hole 43, and for reducing variation in liquid crystal cell thickness of the liquid crystal display 30.

Then, a reflection electrode 38 is formed on the organic insulating film 42 in each region where the bumps 42a are formed. The reflection electrode 38 is connected to the drain electrode 37 through the contact hole 43.

Next, an oxidized layer 38a of alumina (aluminum oxide) is formed on the surface of the reflection electrode 38 to have a thickness of 5 nm to 10 nm. The oxidation process may be performed by soaking the reflection electrode 38 in hydrogen peroxide solution for 3 minutes to 10 minutes at room temperature, or heating in an atmosphere containing oxygen (such as air) for 30 minutes to 60 minutes at a temperature 170° C. to 200° C. In the case of oxidation by heating in the atmosphere, in order to obtain the Grandjean texture of the liquid crystal, the oxidation temperature should be higher than a curing temperature for the vertical alignment film which is formed in a subsequent process. Nitric acid solution may also be used for oxidation of the reflection electrode 38.

Next, vertical alignment film material is applied on the substrate 31 covering at least the oxidized layer 38a by printing or using a spin-coater, followed by curing with heat at a temperature of 160° C. to 180° C. so as to form the vertical alignment film 44. Thus, the active matrix substrate 30a is fabricated.

The counter substrate 30b is produced as follows: The color filter 46 is formed on the substrate 45. In the color filter 46, the filter portion 46a of a color such as magenta or green is provided in each position corresponding to the reflection electrode 38 on the substrate 30a, and the black matrix (black filter) 46b is provided in a portion corresponding to other than the reflection electrode 38. Then, the transparent counter electrode 47 which is made of ITO or the like is formed to cover the entire surface of the color filter 46, and the vertical alignment film 48 is formed on the transparent electrode 47.

Next, sealing material, for example, an adhesive including spacers of 7 μm diameter is applied to at least one of the substrates 30a and 30b by using a screen printing technique. Then the substrates 30a and 30b are combined and adhered together so that the reflection electrode 38 and the filter portion 46a are opposed to each other.

Liquid crystal is injected into a space which is formed between the substrates 30a and 30b via the spacers (not shown), so as to form the liquid crystal layer 49, by using, for example, a vacuum injection method. In the vacuum injection method, the space between the substrates 30a and 30b is vacuumized by aspirating the air through a hole and then liquid crystal is injected into the space through another hole. Other methods may be used for injecting liquid crystal into the space between the substrates 30a and 30b.

In such a liquid crystal display 30 which includes the oxidized layer 38a on the reflection electrode 38, the liquid crystal layer 49 has a Grandjean texture, even though the driving electrode (reflection electrode) 38 is made of aluminum and the counter electrode 47 is made of ITO.

It may be noted that a reflection electrode of aluminum which is formed by sputtering or deposition in a vacuum will have an oxidized surface formed by natural oxidation when the electrode comes into the atmosphere. Such a naturally oxidized surface layer has a thickness of about 3 nm at 25° C. In the case of utilizing the naturally oxidized layer of the reflection electrode in the liquid crystal display, the liquid crystal layer remains in the focal conic texture. The naturally oxidized surface layer is not sufficient to cause the liquid crystal layer to have the Grandjean texture. Accordingly, it is necessary to perform an oxidation process at a temperature higher than the room temperature and, preferably, at 170° C. to 200° C.

In a case where the oxidation process is performed in an atmosphere of pure oxygen, the temperature may be lower than the temperature utilized in an atmosphere of air. According to the present invention, the oxidation process may be performed at a temperature lower than 170° C. to 200° C., as long as the reflection electrode made of aluminum has an oxidized layer with an originally specular surface thereof remaining. In the case where the oxidation process is performed at a higher temperature such as described in the above mentioned U.K. Application No. 2 066 545 A, the surface of the reflection electrode itself is randomly rugged so that the directionality of the reflected light is lost, resulting in a darker display.

Anodization is not preferable to be used in the oxidation process of forming the oxidized layer of the reflection electrode, because honeycomb structure, which causes surface scattering, is easily formed by anodization. If anodization is used for the oxidation process, the resultant oxidized layer should be no greater than 6 nm in order to avoid formation of the honeycomb structure.

In this example, the reflection electrode is made of aluminum. The reflection electrode is not limited to aluminum, but instead may be made of an aluminum alloy as long as the preferred reflective properties thereof remain. For example, an aluminum alloy which contains one or more metals having a relatively high melting point such as silicon, copper, magnesium, titanium, tantalum, and the like, less than 10% by weight.

EXAMPLE 2

The present invention is not limited to the use of an oxidized layer formed by oxidizing the surface of the reflection electrode of aluminum. In another embodiment, rather than oxidizing the surface of the reflection electrode, an oxide film such as silicon oxide may be formed in lieu of the oxidized surface by, for example, sputtering the oxide film on the substrate so as to cover at least the reflection electrode. The preferable thickness of the oxide film is 50 nm to 100 nm.

Figure 16:
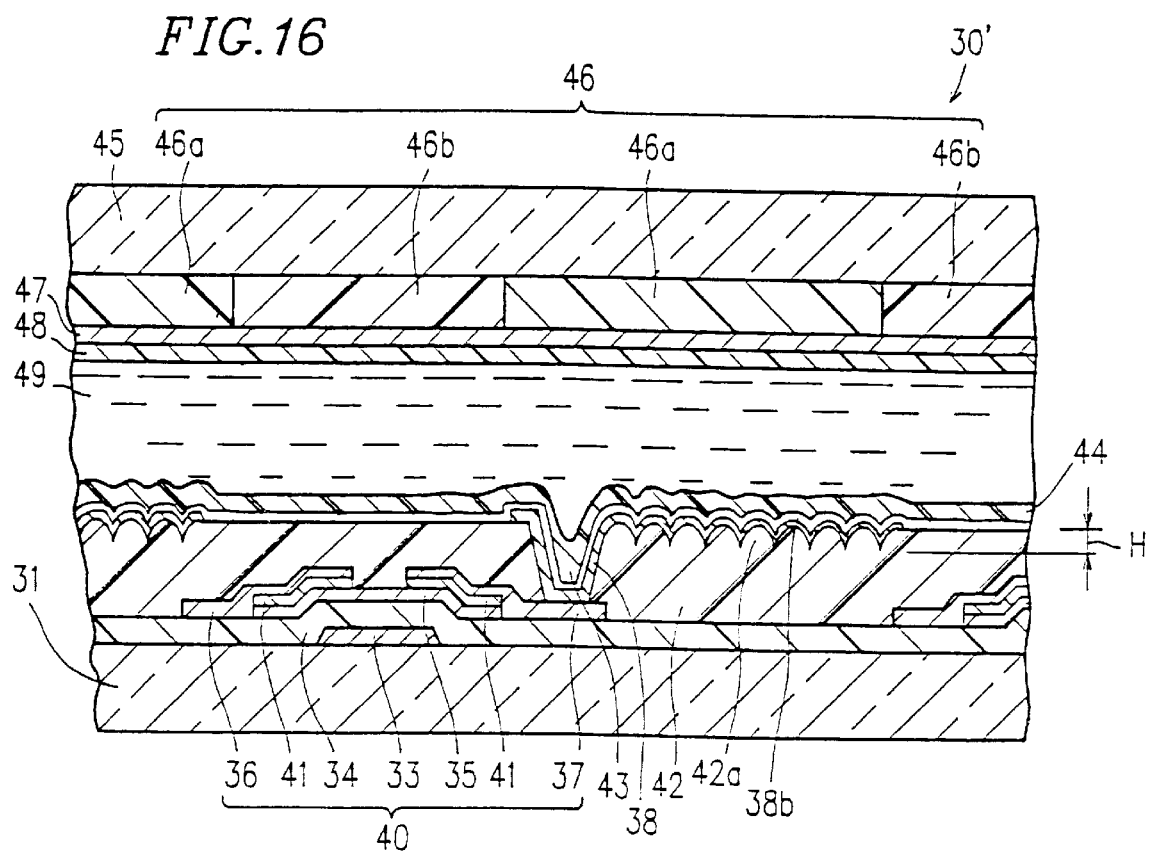
FIG. 16 is a partial cross-sectional view of a reflection type liquid crystal display of another embodiment of the present invention.

For example, FIG. 16 shows a liquid crystal display 30' in which a silicon oxide film 38b is formed on the entire surface of the substrate 31 covering the reflection electrode 38 and the organic insulating film 42. The silicon oxide film 38b exhibits the same effect as that of the oxidized layer 38a of alumina.

EXAMPLE 3

The present invention is not limited to a reflection type liquid crystal display which utilizes TFTs as switching elements, but can be applied to other reflection type liquid crystal displays which utilize two-terminal elements such as MIM elements or diode-rings.

The present invention can be applied to the following driving modes of liquid crystal display as well as to a phase transition type guest-host mode, using reflection electrodes made of aluminum or aluminum alloy and a vertical alignment film formed thereon. According to the present invention, by forming an oxidized layer of the reflection electrode or an oxide film on the reflection electrode, effects of the vertical alignment film are improved as described in the previous examples. Thus, the molecules in the liquid crystal layer are well orientated in a direction perpendicular to the surface of the substrate where the vertical alignment film is formed, such as the Grandjean texture. This makes it possible to increase contrast of the display and response speed of the liquid crystal.

Figure 17A:
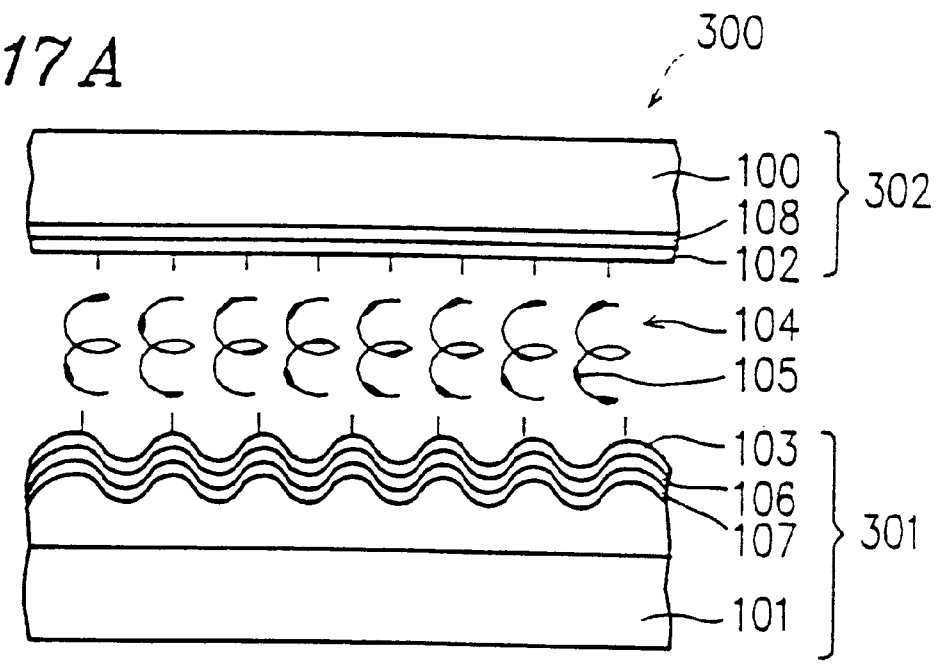
FIGS. 17A and 17B are schematic diagrams illustrating a liquid crystal driving mode of a reflection type liquid crystal display of one embodiment of the present invention.
Figure 17B:
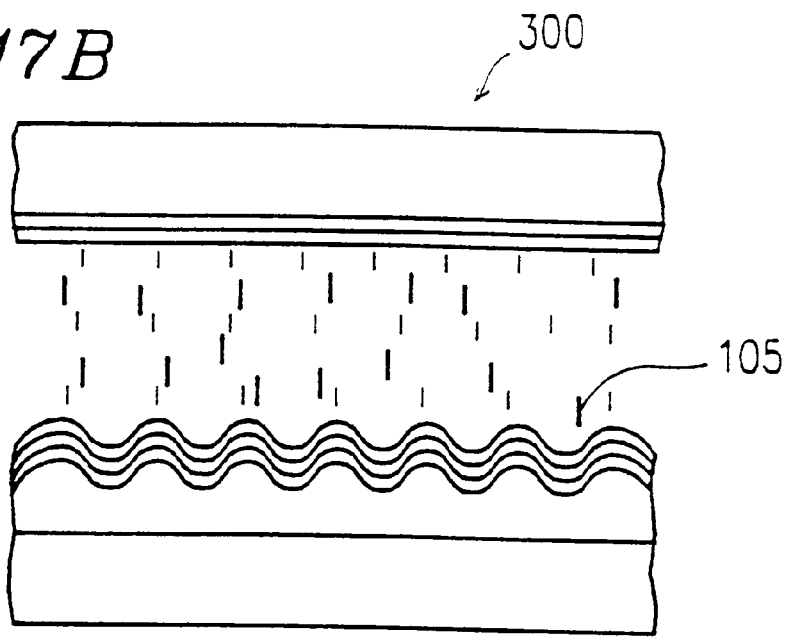

One of the driving modes is the negative type White Taylor (WT) mode. FIGS. 17A and 17B show schematically and partially a reflection type liquid crystal display 300 according to the present invention using negative type WT mode.

As shown in FIG. 17A, the reflection type liquid crystal display 300 includes a lower substrate 301, an upper substrate 302, and a liquid crystal layer 104 interposed therebetween. The liquid crystal layer contains dye 105. The lower substrate 301 comprises a reflection electrode 107 of aluminum formed on a substrate 101, an oxidized layer 106 which is formed by oxidizing the surface of the reflection electrode 107, and a vertical alignment film 103 formed on the oxidized layer 106. The upper substrate comprises a transparent counter electrode 108 of ITO formed on a substrate 100, and a vertical alignment film 102 formed on the counter electrode 108.

In the negative type WT mode, when a voltage is applied to the liquid crystal layer 104, the long axis of the liquid crystal molecule (not shown) and dye 105 are aligned along the electric field as shown in FIG. 17B.

Figure 18A:
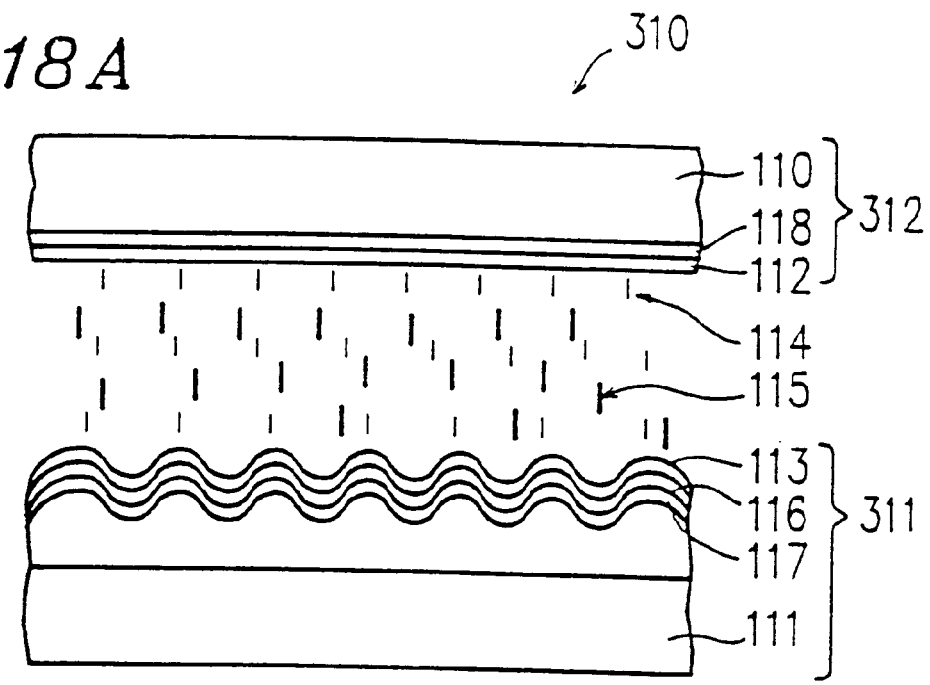
FIGS. 18A and 18B are schematic diagrams illustrating another liquid crystal driving mode of a reflection type liquid crystal display of one embodiment of the present invention.
Figure 18B:
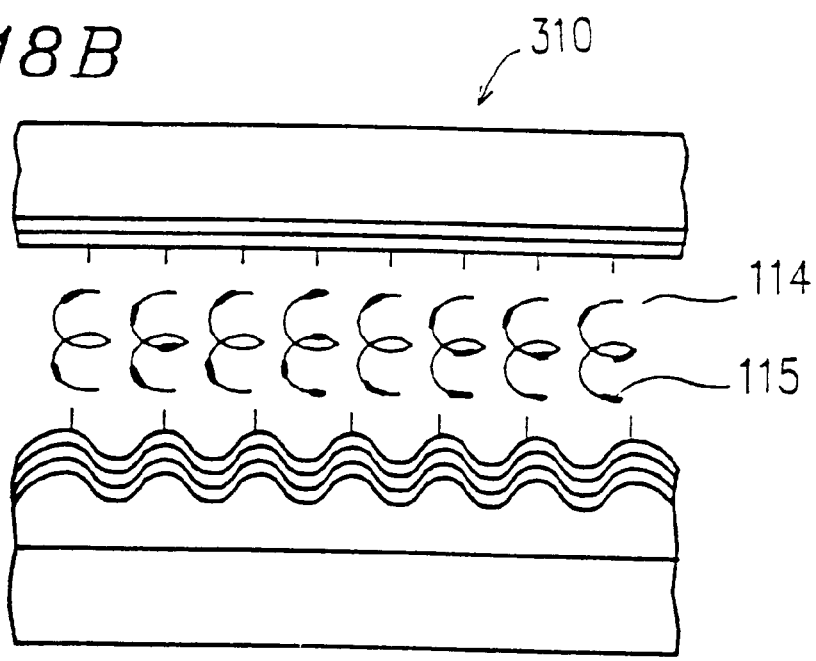

Another of the driving modes is the positive type WT mode. FIGS. 18A and 18B show schematically and partially a reflection type liquid crystal display 310 according to the present invention using positive type WT mode.

As shown in FIG. 18A, the reflection type liquid crystal display 310 includes a lower substrate 311, an upper substrate 312, and a liquid crystal layer 114 interposed therebetween. The liquid crystal layer contains dye 115. The lower substrate 311 comprises a reflection electrode 117 of aluminum formed on a substrate 111, an oxidized layer 116 which is formed by oxidizing the surface of the reflection electrode 117, and a vertical alignment film 113 formed on the oxidized layer 116. The upper substrate 312 comprises a transparent counter electrode 118 of ITO formed on a substrate 110, and a vertical alignment film 112 formed on the counter electrode 118.

In the positive type WT mode, when a voltage is not applied to the liquid crystal layer 114, the long axis of the liquid crystal molecule (not shown) and dye 115 are aligned along the vertical direction to the surfaces of the substrates 110 and 111 as shown in FIG. 18A. FIG. 18B shows an orientation of the dye 115 when a voltage is applied to the liquid crystal layer 114.

Figure 19A:
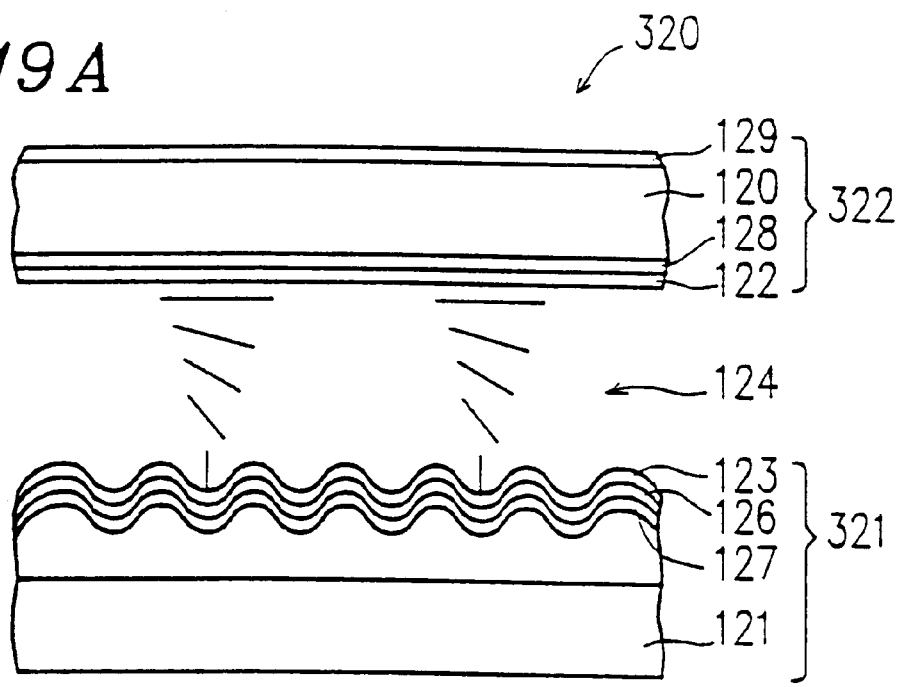
FIGS. 19A and 19B are schematic diagrams illustrating still another liquid crystal driving mode of a reflection type liquid crystal display of one embodiment of the present invention.
Figure 19B:
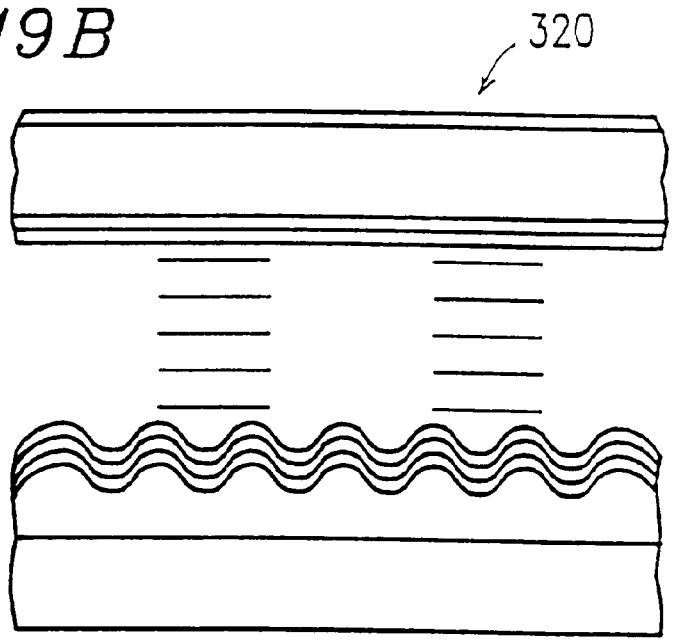

FIGS. 19A and 19B show another reflection type liquid crystal display 320 according to the present invention.

As shown in FIG. 19A, the reflection type liquid crystal display 320 includes a lower substrate 321, an upper substrate 322, and a liquid crystal layer 124 interposed therebetween. The lower substrate 321 comprises a reflection electrode 127 of aluminum formed on a substrate 121, an oxidized layer 126 which is formed by oxidizing the surface of the reflection electrode 127, and a vertical alignment film 123 formed on the oxidized layer 126. The upper substrate 322 comprises a transparent counter electrode 128 of ITO formed on a substrate 120, a parallel alignment film 122 formed on the counter electrode 128, and a polarizer 129 formed on the outer face of the upper substrate 322. The parallel alignment film 122 is formed by using rubbing treatment, for example.

When a voltage is applied to the liquid crystal layer 124, as shown in FIG. 19B, the long axis of the liquid crystal molecule in aligned parallel to the surfaces of the substrates 120 and 121.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a reflection type liquid crystal display comprising:
    a first substrate including a rough portion formed on a surface thereof, a reflection electrode formed on the rough portion, the reflection electrode including a surface oxidation layer, and a vertical alignment film made of insulating material formed on the surface oxidation layer;
    a second substrate including a counter electrode formed thereon; and
    a liquid crystal layer interposed between the first and second substrates, driven by the reflection electrode and the counter electrode to perform a display, the method including the steps of:
        pattering the reflection electrode from a thin metallic film made of aluminum or aluminum alloy which is formed on the first substrate covering the rough portion;
        oxidizing a surface of the reflection electrode whereby forming a surface oxidation layer having a thickness of at least 5 nm;
        applying vertical alignment film material at least on the surface oxidation layer; and
        heating and curing the vertical alignment film material whereby forming the vertical alignment film.

2. A method for producing a reflection type liquid crystal display according to claim 1, wherein the surface oxidation layer is formed to have a thickness of 5 nm to 10 nm in the oxidizing step.

3. A method for producing a reflection type liquid crystal display according to claim 1, wherein the oxidizing step is performed in an atmosphere including oxygen and at a temperature 170° C. to 200° C. which is higher than a heating temperature of the heating and curing step.

4. A method for producing a reflection type liquid crystal display according to claim 1, wherein the oxidizing step is performed by soaking the reflection electrode in hydrogen peroxide solution or nitric acid solution.

5. A method for producing a reflection type liquid crystal display comprising:
    a first substrate including a rough portion formed on a surface thereof, a reflection electrode formed on the rough portion, an oxide film formed on the reflection electrode, and a vertical alignment film made of insulating material formed on the oxide film;
    a second substrate including a counter electrode formed thereon; and
    a liquid crystal layer interposed between the first and second substrates, driven by the reflection electrode and the counter electrode to perform a display, the method including the steps of:
        pattering the reflection electrode from a thin metallic film made of aluminum or aluminum alloy which is formed on the first substrate covering the rough portion;
        forming an oxide film on the first substrate so as to cover the reflection electrode;
        applying vertical alignment film material on the oxidized film; and
        heating and curing the vertical alignment film material whereby forming the vertical alignment film.

6. A method for producing a reflection type liquid crystal display according to claim 5, wherein the oxide film is formed to have a thickness of 50 nm to 100 nm in the forming step.

7. A method for producing a reflection type liquid crystal display according to claim 5, wherein the oxide film is made of silicon oxide.

* * * * *